June 26, 1923.

P. OLIVE

UNIVERSAL JOINT

Filed April 1, 1921

1,460,212

2 Sheets-Sheet 1

INVENTOR
Paul Olive
BY
ATTORNEY

June 26, 1923.
P. OLIVE
UNIVERSAL JOINT
Filed April 1, 1921
1,460,212
2 Sheets-Sheet 2
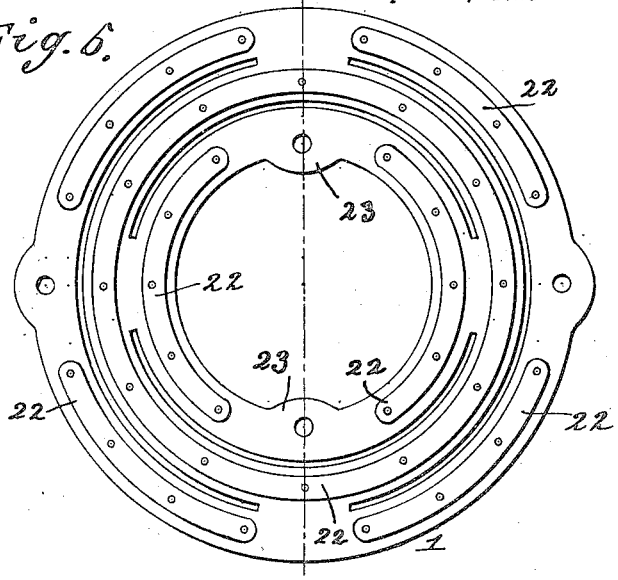
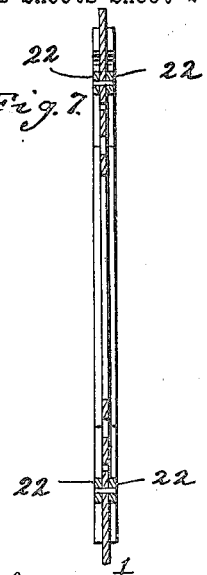
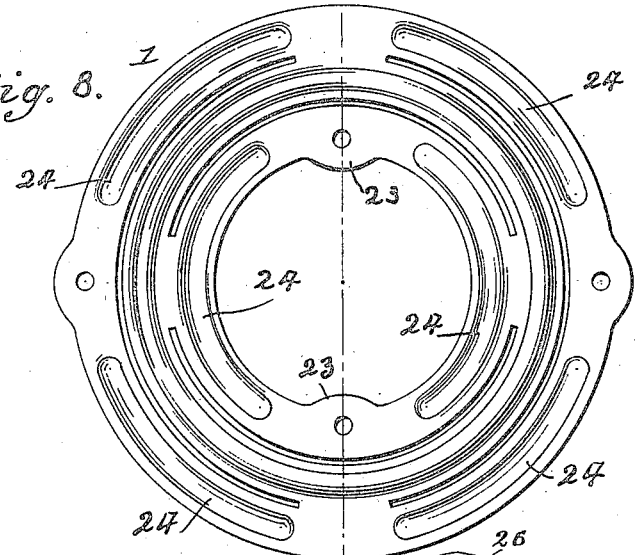
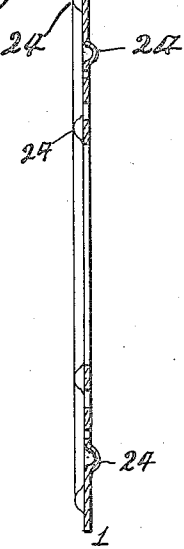
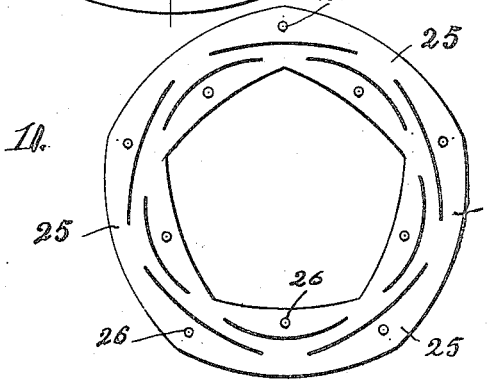
INVENTOR
Paul Olive
BY
ATTORNEY Patented June 26, 1923.

1,460,212

UNITED STATES PATENT OFFICE.

PAUL OLIVE, OF HEMPSTEAD, NEW YORK.

UNIVERSAL JOINT.

Application filed April 1, 1921. Serial No. 457,634.

*To all whom it may concern:*

Be it known that I, PAUL OLIVE, a citizen of France, and resident of Hempstead, in the county of Nassau and State of New York, have invented certain new and useful Improvements in Universal Joints, of which the following is a specification.

The present invention relates to universal joints, and has for its objects the provision of a power transmission device of this character which smoothly operates without jarring or jolting; which absorbs all shocks between a driving and a driven shaft; which requires no lubrication; and is of durable, inexpensive and simple construction comprising few parts assembled in such novel manner as to maintain the device in constantly operative condition.

In carrying out my invention I employ flexible sheet metal discs embodying a plurality of integrally formed radially spaced segments and means for coupling them to adjacent shaft-sections, as fully hereinafter disclosed and specifically set forth in the appended claims.

Figure 1:
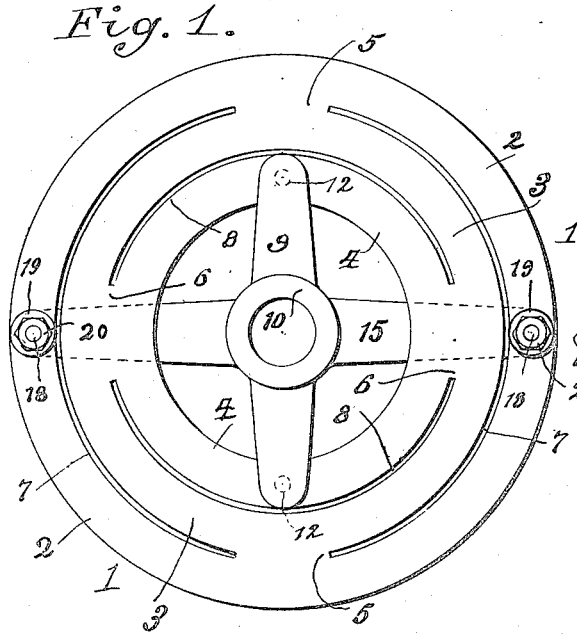
Figure 2:
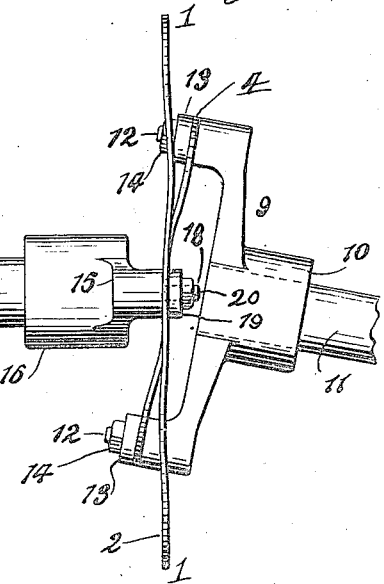
Figure 4:
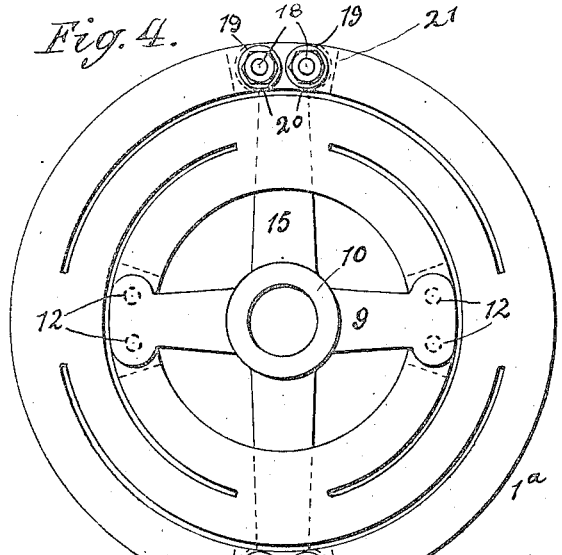
Figure 3:
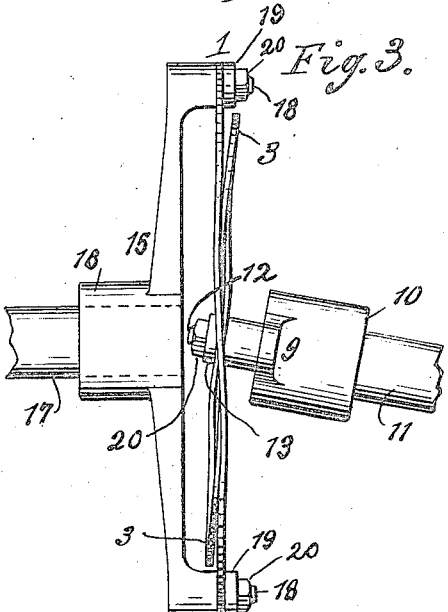
Figure 5:

In the accompanying drawings forming part of this specification, Figure 1 is an end view of one embodiment of my invention. Fig. 2 is a side view thereof. Fig. 3 is a similar side view as seen from another angle. Fig. 4 is an end view illustrating a slight modification; and Fig. 5 is an edge view of the discs forming part thereof. Fig. 6 is a side view of a modified disc construction; and Fig. 7 is a cross sectional view thereof taken on the line 7—7 of said Fig. 6. Fig. 8 is a side view illustrating a further modification. Fig. 9 is a cross sectional view thereof; and Fig. 10 is a side view showing a still further modification of disc construction.

In the embodiment of my invention as illustrated, referring particularly to Figures 1 to 3, inclusive, I provide a circular disc 1, composed of flexible sheet metal and which embodies, in integral formation, concentrically arranged members 2, 3 and 4 which are radially connected by oppositely located integral segments 5 and 6 and spaced apart by oppositely located segmental slots 7 and 8, whereby the members 2, 3 and 4 respectively embody segments adapted for bending movement in opposite directions.

Fixed to the inner disc member 4, and having its arms extended on a diametrical line which bisects the segments 5, is a yoke or coupling 9, having a hub 10 adapted for connection with a shaft section 11. Each arm of the yoke 9 is provided with a screw-stud 12 which extends through the member 4 and a washer 13, and is secured by a nut 14.

On the opposite side of the disc 1, and having its respective arms extended on a diametrical line which runs in a right angle direction across the yoke 9 and bisects the segments 6, is a similar yoke 15, having a hub 16, adapted for fixed engagement with a shaft-section 17. The free ends of the arms of said yoke 15 are respectively provided with a screw-stud 18 which extends through the member 2 and a washer 19, and is fixed by means of a nut 20.

The shafts 11 and 17, when extended on non-coaxial lines diverging from the disc center, as shown by Figures 2 and 3, may constitute a driving and a driven shaft, whereby rotary motion imparted to one transmits rotary motion to the other without any jarring or grinding action, owing to the yielding and flexible nature of the disk members whose integrally connected segments traverse on spiral lines in perfect unison and without friction, thus effectually cushioning and absorbing any shocks in the driving shaft which are generally transmitted through the ordinary universal joints and act to rapidly wear their bearing points, whereby the strain is intensified, and the full impact of the driving force is transmitted to the driven means. By employing my invention all shocks and jolts are absorbed in the joint itself and the driven means may be operated without having any jarring and racking motion transmitted thereto.

My invention may comprise a single disc, as above described, or a plurality of discs 1ª, 1ᵇ and 1ᶜ may be employed, as shown by Figures 4 and 5 of the drawings. When a plurality of discs are employed they are laterally spaced apart by means of fixed plates or washers 21.

In constructions where great strength is essential the discs may be reinforced by flexible metal segments 22, as shown by Fig. 6 of the drawings, and they may be further strengthened at the bearing points for the yoke connection by means of extended integral parts 23. Or the reinforcing means may constitute integrally formed punched up segments 24, as disclosed by Figures 8 and 9 of the drawings.

In Figure 10 of the drawings I have illustrated a disc construction of slightly modified conformation embodying a plurality of integrally formed segments 25, having lateral openings 26 therethrough, for engaging fastening means of spider-like couplings, and a plurality of segmental spacing slots 27 located in staggered correlation.

Various other disc shapes and differential arrangements of parts may be employed without departing from the spirit and scope of my invention.

Having thus described my invention, what I claim as new and desire to secure by Letters Patent, is:

1. A universal joint comprising a flexible disc embodying a plurality of integrally formed, concentrically arranged annular members respectively embodying a plurality of radially connected segments, and means for coupling said disc to oppositely located adjacent shaft sections.

2. A universal joint comprising a flexible sheet metal disc embodying a plurality of integrally formed concentrically arranged annular members respectively embodying a plurality of radially connected segments, and means for coupling the outer annular member to a shaft section, and means for coupling the inner annular member to an adjacent shaft section.

3. A universal joint comprising a flexible disc composed of superposed layers, said disc embodying a plurality of integrally formed concentrically arranged annular members respectively embodying a plurality of radially connected segments, and means for coupling the outer annular members to a shaft section, and means for coupling the inner annular member to an adjacent shaft section.

4. A universal joint comprising a flexible sheet metal disc embodying a plurality of integrally formed concentrically arranged members respectively embodying a plurality of radially spaced segments, and a coupling fixed to one side of the inner member of the disc, and an oppositely located coupling fixed to the outer member of the disc, said coupling adapted for connection with oppositely located non-coaxial sections.

5. A universal joint comprising a flexible disc embodying a plurality of integrally formed, concentrically arranged annular members respectively embodying a plurality of radially connected segments, and means for reinforcing said segments, and means for coupling said disc to oppositely located adjacent shaft sections.

Signed at the city of New York, in the county of New York and State of New York, this 20th day of March, A. D. 1921.

PAUL OLIVE.